US012578991B2

(12) United States Patent
Foley

(10) Patent No.: US 12,578,991 B2
(45) Date of Patent: *Mar. 17, 2026

(54) PARALLEL PROCESSING ARCHITECTURE WITH DISTRIBUTED REGISTER FILES

(71) Applicant: Ascenium, Inc., Campbell, CA (US)

(72) Inventor: Peter Foley, Los Altos Hills, CA (US)

(73) Assignee: Ascenium, Inc., Mountain View, CA (US)

( * ) Notice: Subject to any disclaimer, the term of this patent is extended or adjusted under 35 U.S.C. 154(b) by 872 days.

This patent is subject to a terminal disclaimer.

(21) Appl. No.: 17/752,898

(22) Filed: May 25, 2022

(65) Prior Publication Data

US 2022/0291957 A1     Sep. 15, 2022

Related U.S. Application Data

(63) Continuation-in-part of application No. 17/526,003, filed on Nov. 15, 2021, which is a
(Continued)

(51) Int. Cl.
G06F 9/48      (2006.01)
G06F 9/30      (2018.01)
G06F 9/38      (2018.01)

(52) U.S. Cl.
CPC .......... *G06F 9/4881* (2013.01); *G06F 9/3012* (2013.01); *G06F 9/3838* (2013.01)

(58) Field of Classification Search
CPC ..... G06F 9/4881; G06F 9/3012; G06F 9/3838
See application file for complete search history.

(56) References Cited

U.S. PATENT DOCUMENTS 4,571,678 A * 2/1986 Chaitin ................... G06F 8/441
                                                    717/146
5,594,884 A     1/1997 Matoba et al.
(Continued)

FOREIGN PATENT DOCUMENTS

KR    10-2015-0051083 A    5/2015
WO    WO2011038940 A1    4/2011

OTHER PUBLICATIONS

Musicus, (The OKI Advanced Array Processor (AAP)—Development Software Manual, RLE Technical Report No. 539, Research Laboratory of Electronics, Massachusetts Institute of Technology, Dec. 1988) (Year: 1988).*
(Continued)

*Primary Examiner* — Wissam Rashid
(74) *Attorney, Agent, or Firm* — Adams Intellex, PLC

(57) ABSTRACT

Techniques for task processing based on a parallel processing architecture with distributed register files are disclosed. A two-dimensional array of compute elements is accessed. Each compute element is known to a compiler and is coupled to its neighboring compute elements. The array of compute elements is controlled on a cycle-by-cycle basis. The controlling is enabled by a stream of wide, variable length, control words generated by the compiler. Virtual registers are mapped to a plurality of physical register files distributed among one or more of the compute elements. Virtual registers are represented by the compiler. The mapping is performed by the compiler. A broadcast write operation is enabled to two or more of the physical register files. Operations contained in the control words are executed. Operations are enabled by at least one of the distributed physical register files. Implementation in separate compute elements enables parallel operation processing.

19 Claims, 7 Drawing Sheets

Related U.S. Application Data continuation-in-part of application No. 17/465,949, filed on Sep. 3, 2021.

(60) Provisional application No. 63/340,499, filed on May 11, 2022, provisional application No. 63/322,245, filed on Mar. 22, 2022, provisional application No. 63/318,413, filed on Mar. 10, 2022, provisional application No. 63/295,544, filed on Dec. 31, 2021, provisional application No. 63/254,557, filed on Oct. 12, 2021, provisional application No. 63/232,230, filed on Aug. 12, 2021, provisional application No. 63/229,466, filed on Aug. 4, 2021, provisional application No. 63/193,522, filed on May 26, 2021, provisional application No. 63/166,298, filed on Mar. 26, 2021, provisional application No. 63/125,994, filed on Dec. 16, 2020, provisional application No. 63/114,003, filed on Nov. 16, 2020, provisional application No. 63/091,947, filed on Oct. 15, 2020, provisional application No. 63/075,849, filed on Sep. 9, 2020.

(56) References Cited

U.S. PATENT DOCUMENTS

| | | | |
|---|---|---|---|
| 5,764,994 A | | 6/1998 | Craft |
| 5,987,259 A * | | 11/1999 | Goebel .................. G06F 8/441 |
| | | | 712/214 |
| 6,178,482 B1 * | | 1/2001 | Sollars ................... G06F 9/463 |
| | | | 712/E9.023 |
| 7,373,484 B1 * | | 5/2008 | Radhakrishnan ....... G06F 9/384 |
| | | | 712/E9.05 |
| 7,840,777 B2 | | 11/2010 | Mykland |
| 8,694,978 B1 | | 4/2014 | Rus et al. |
| 8,856,768 B2 | | 10/2014 | Mykland |
| 8,869,123 B2 | | 10/2014 | Mykland |
| 8,949,806 B1 | | 2/2015 | Lee et al. |
| 9,158,544 B2 | | 10/2015 | Mykland |
| 9,304,770 B2 | | 4/2016 | Mykland |
| 9,395,992 B2 | | 7/2016 | Doing et al. |
| 9,424,055 B2 | | 8/2016 | Lundvall et al. |
| 9,473,155 B2 | | 10/2016 | Staszewski et al. |
| 9,477,470 B2 | | 10/2016 | Mykland |
| 9,529,715 B2 | | 12/2016 | Kumar et al. |
| 9,582,277 B2 | | 2/2017 | Muff et al. |
| 9,594,559 B2 | | 3/2017 | Fontenot et al. |
| 9,600,287 B2 | | 3/2017 | Gschwind et al. |
| 9,633,160 B2 | | 4/2017 | Mykland |
| 9,652,238 B2 | | 5/2017 | Muff et al. |
| 9,684,511 B2 | | 6/2017 | Shanbhogue et al. |
| 9,830,164 B2 | | 11/2017 | Yazdani |
| 9,851,969 B2 | | 12/2017 | Greiner et al. |
| 9,886,277 B2 | | 2/2018 | Loktyukhin et al. |
| 9,898,293 B2 | | 2/2018 | Whittaker |
| 9,921,836 B2 | | 3/2018 | Kumar et al. |
| 9,928,062 B2 | | 3/2018 | Azagury et al. |
| 9,934,040 B2 | | 4/2018 | Bonanno et al. |
| 9,971,605 B2 | | 5/2018 | Henry et al. |
| 9,977,674 B2 | | 5/2018 | Rupley, II et al. |
| 9,977,675 B2 | | 5/2018 | Nystad |
| 9,977,679 B2 | | 5/2018 | Caulfield et al. |
| 9,983,882 B2 | | 5/2018 | Greiner et al. |
| 9,983,884 B2 | | 5/2018 | Maiyuran et al. |
| 10,089,277 B2 | | 10/2018 | Mykland |
| 2002/0144091 A1 * | | 10/2002 | Widigen ............... G06F 9/3858 |
| | | | 712/217 |
| 2002/0174318 A1 | | 11/2002 | Studdard et al. |
| 2004/0111710 A1 | | 6/2004 | Chakradhar et al. |
| 2010/0318608 A1 | | 12/2010 | Huang et al. |
| 2013/0326190 A1 | | 12/2013 | Chung et al. |
| 2014/0149657 A1 | | 5/2014 | Jakovljevic et al. |
| 2014/0317383 A1 | | 10/2014 | Park et al. |
| 2015/0186146 A1 | | 7/2015 | Kushida et al. |
| 2016/0246602 A1 | | 8/2016 | Radhika et al. |
| 2018/0225116 A1 | | 8/2018 | Henry et al. |
| 2018/0307980 A1 | | 10/2018 | Barik et al. |
| 2018/0322606 A1 | | 11/2018 | Das et al. |
| 2018/0341493 A1 | | 11/2018 | Roy et al. |
| 2019/0004777 A1 | | 1/2019 | Meixner |
| 2019/0347190 A1 | | 11/2019 | Singh |
| 2019/0369990 A1 | | 12/2019 | Doerr et al. |
| 2019/0391796 A1 * | | 12/2019 | Brady ..................... G06F 8/458 |
| 2020/0026498 A1 | | 1/2020 | Sumbul et al. |
| 2020/0241879 A1 | | 7/2020 | Vorbach et al. |

OTHER PUBLICATIONS

Chang, Kyungwook, and Kiyoung Choi. "Mapping control intensive kernels onto coarse-grained reconfigurable array architecture." 2008 International SoC Design Conference. vol. 1. IEEE, 2008.

International Search Report dated Sep. 5, 2022 for PCT 2022/030800.

Musicus, B. R. (1988). The OKI advanced array processor (AAP): Development Software Manual.

* cited by examiner

500

LOAD BUFFERS
518

UPPER MULTIPLIER ELEMENTS
514

COMPUTE ELEMENTS
510

LOWER MULTIPLIER ELEMENTS
512

LOAD BUFFERS
516

PARALLEL PROCESSING ARCHITECTURE WITH DISTRIBUTED REGISTER FILES

RELATED APPLICATIONS

This application claims the benefit of U.S. provisional patent applications "Distributed Renaming Within A Statically Scheduled Array" Ser. No. 63/193,522, filed May 26, 2021, "Parallel Processing Architecture For Atomic Operations" Ser. No. 63/229,466, filed Aug. 4, 2021, "Parallel Processing Architecture With Distributed Register Files" Ser. No. 63/232,230, filed Aug. 12, 2021, "Load Latency Amelioration Using Bunch Buffers" Ser. No. 63/254,557, filed Oct. 12, 2021, "Compute Element Processing Using Control Word Templates" Ser. No. 63/295,544, filed Dec. 31, 2021, "Highly Parallel Processing Architecture With Out-Of-Order Resolution" Ser. No. 63/318,413, filed Mar. 10, 2022, "Autonomous Compute Element Operation Using Buffers" Ser. No. 63/322,245, filed Mar. 22, 2022, and "Parallel Processing Of Multiple Loops With Loads And Stores" Ser. No. 63/340,499, filed May 11, 2022.

This application is also a continuation-in-part of U.S. patent application "Highly Parallel Processing Architecture With Compiler" Ser. No. 17/526,003, filed Nov. 15, 2021, which claims the benefit of U.S. provisional patent applications "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, "Parallel Processing Architecture For Atomic Operations" Ser. No. 63/229,466, filed Aug. 4, 2021, "Parallel Processing Architecture With Distributed Register Files" Ser. No. 63/232,230, filed Aug. 12, 2021, and "Load Latency Amelioration Using Bunch Buffers" Ser. No. 63/254,557, filed Oct. 12, 2021.

The U.S. patent application "Highly Parallel Processing Architecture With Compiler" Ser. No. 17/526,003, filed Nov. 15, 2021 is also a continuation-in-part of U.S. patent application "Highly Parallel Processing Architecture With Shallow Pipeline" Ser. No. 17/465,949, filed Sep. 3, 2021, which claims the benefit of U.S. provisional patent applications "Highly Parallel Processing Architecture With Shallow Pipeline" Ser. No. 63/075,849, filed Sep. 9, 2020, "Parallel Processing Architecture With Background Loads" Ser. No. 63/091,947, filed Oct. 15, 2020, "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array " Ser. No. 63/193,522, filed May 26, 2021, Parallel Processing Architecture For Atomic Operations" Ser. No. 63/229,466, filed Aug. 4, 2021, and "Parallel Processing Architecture With Distributed Register Files" Ser. No. 63/232,230, filed Aug. 12, 2021.

Each of the foregoing applications is hereby incorporated by reference in its entirety.

FIELD OF ART

This application relates generally to task processing and more particularly to a parallel processing architecture with distributed register files.

BACKGROUND

The frequent processing of immense and varied datasets is performed by organizations for commercial, governmental, medical, educational, research, or retail purposes, among many others. Vast resources are expended by these organizations for the data processing because the success or failure of a given organization directly depends on its ability to process the data for both financial and competitive benefit. The organization thrives when the data processing successfully fulfills these objectives. Otherwise, if the data processing is unsuccessful, then the organization founders. Many and varied data collection techniques are used to collect the data from a wide and diverse range of individuals. The individuals include customers, citizens, patients, purchasers, students, test subjects, and volunteers. At times the individuals are willing participants, while at other times they are unwitting subjects or even victims of data collection. Common data collection strategies include "opt-in" techniques, where an individual signs up, registers, creates an account, or otherwise willingly agrees to participate in the data collection. Other techniques are legislative, such as a government requiring citizens to obtain a registration number and to use that number while interacting with government agencies, law enforcement, emergency services, and others. Additional data collection techniques are more subtle or completely hidden, such as tracking purchase histories, website visits, button clicks, and menu choices. Irrespective of the techniques used for the data collection, the collected data is highly valuable to the organizations.

Furthermore, the rapid processing of such data can be a critical business imperative for many organizations such as scientific organizations, governmental organizations, research organizations, commercial organizations, and medical organizations, to name just a few. The data to be processed can take many different forms, but it is often stored in huge datasets that contain vast amounts of data. To make matters more difficult, the data stored in large datasets is often kept in an unstructured format. That is, there is no simple way of indexing a particular piece of data that might be needed. Sometimes an entire, vast dataset must be processed in order to extract a single, critical data record. An organization that successfully manages its data can often attribute its success to the processing of that data in an efficient and useful way. Similarly, an organization that unsuccessfully manages its data can likewise often attribute its failure to the lack of efficient and useful data processing. Data processing can be extremely resource intensive, requiring financial resources, human resources, capital resources, physical resources, energy resources, and so on. Energy resources, in particular, can be very difficult to manage. Cloud-based computing vendors often pack a large room with many thousands of server computers and sell compute time spread across those systems. In some instances, a subset of particular hardware is set aside for a particular customer to provide a "private" cloud experience. But even if an organization utilizes its own data center, there are cooling challenges that need to be managed, in addition to sourcing large amounts of electricity without making adverse environmental decisions. Efficient processing of large amounts of data is a difficult and challenging task, no matter what organization is using the data.

SUMMARY

The large numbers of processing jobs that are performed by organizations are critical to the missions of the organizations. The job processing typically includes running payroll, analyzing research data, or training a neural network for machine learning. These jobs are highly complex and are composed of many tasks. The tasks can include loading and storing various datasets, accessing processing components and systems, executing data processing, and so on. The tasks themselves are typically based on subtasks which themselves can be complex. The subtasks can be used to handle specific jobs such as loading or reading data from storage, performing computations and other manipulations on the data, storing or writing the data back to storage, handling inter-subtask communication such as data transfer and control, and so on. The datasets that are accessed are often immense, and can easily overwhelm processing architectures that are either ill-suited to the processing tasks or inflexible in their designs. To greatly improve task processing efficiency and throughput, two-dimensional (2D) arrays of elements can be used for the processing of the tasks and subtasks. The 2D arrays include compute elements, multiplier elements, registers, caches, queues, controllers, decompressors, arithmetic logic units (ALUs), storage elements, and other components which can communicate among themselves. These arrays of elements are configured and operated by providing control to the array of elements on a cycle-by-cycle basis. The control of the 2D array is accomplished by providing control words generated by a compiler. The control includes a stream of control words, where the control words can include wide, variable length, microcode control words generated by the compiler. The control words are used to configure the array, to control the flow or transfer of data, and to manage the processing of the tasks and subtasks. Further, the arrays can be configured in a topology which is best suited to the task processing. The topologies into which the arrays can be configured include a systolic, a vector, a cyclic, a spatial, a streaming, or a Very Long Instruction Word (VLIW) topology, among others. The topologies can include a topology that enables machine learning functionality.

Task processing is based on a parallel processing architecture with distributed register files. A two-dimensional (2D) array of compute elements is accessed, wherein each compute element within the array of compute elements is known to a compiler and is coupled to its neighboring compute elements within the array of compute elements. The array of compute elements is controlled on a cycle-by-cycle basis, wherein the controlling is enabled by a stream of wide, variable length, control words generated by the compiler. Virtual registers are mapped to a plurality of physical register files distributed among one or more of the compute elements, wherein the mapping is performed by the compiler. Operations contained in the control words are executed, wherein the operations are enabled by at least one of the plurality of distributed physical register files.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
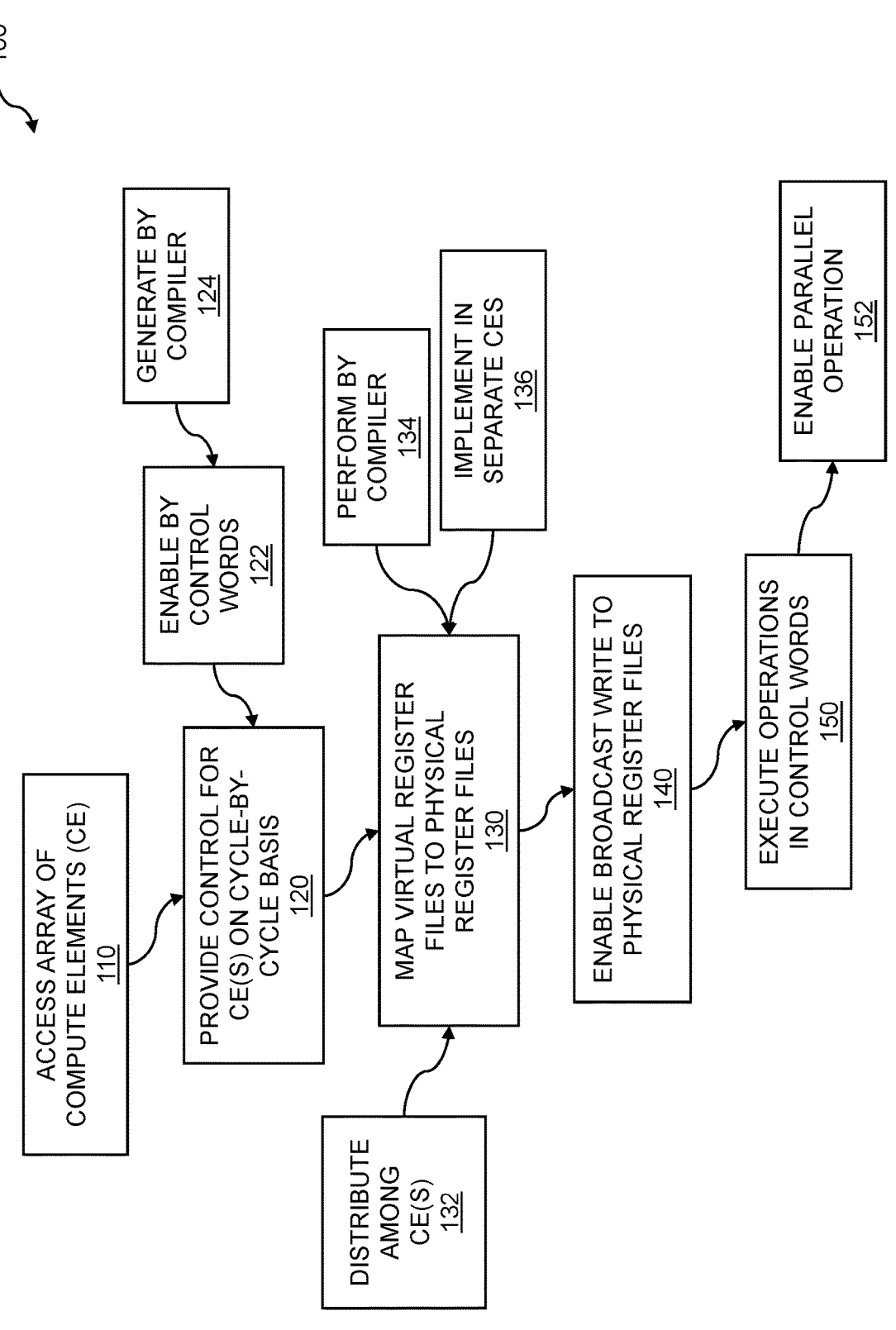
FIG. 1 is a flow diagram for a parallel processing architecture with distributed register files.

Techniques for a parallel processing architecture with distributed register files are disclosed. The distributed register files enable tasks, subtasks, processes, and so on to use virtual registers represented by a compiler. The virtual registers are mapped to physical register files that are distributed among compute elements within a two-dimensional 2D array of compute elements. At least two physical registers to which the virtual registers are mapped are implemented in separate compute elements within the array of compute elements. By mapping the virtual registers to a plurality of physical register files, at least two copies of the data within the virtual registers can be positioned adjacent to or in near proximity to the compute elements that will be used to process the data. Further, the data can be transferred or "preloaded" into the physical register prior to executing the tasks or subtasks that process the data. Thus, the implementation in separate compute elements enables parallel operation processing.

Each of the physical register files comprises a memory element with two read ports and one write port (2R1W). The 2R1W memory element enables two read operations and one write operation to occur substantially simultaneously. A plurality of 2R1W physical register files is distributed throughout the array. Distribution of copies of data to a plurality of two read-port, one write-port (2R1W) register files configured within a 2D array of compute elements is accomplished using a broadcast technique. The plurality of 2R1W register files enhances task and subtask processing. The tasks and subtasks that are executed can be associated with a wide range of applications based on data manipulation, such as image or audio processing applications, AI applications, business applications, data processing and analysis, and so on. The tasks that are executed can perform a variety of operations including arithmetic operations, shift operations, logical operations including Boolean operations, vector or matrix operations, tensor operations, and the like. The subtasks can be executed based on precedence, priority, coding order, amount of parallelization, data flow, data availability, compute element availability, communication channel availability, and so on.

The data manipulations are performed on a two-dimensional (2D) array of compute elements. The compute elements within the 2D array can be implemented with central processing units (CPUs), graphics processing units (GPUs), application specific integrated circuits (ASICs), field programmable gate arrays (FPGAs), processing cores, or other processing components or combinations of processing components. The compute elements can include heterogeneous processors, homogeneous processors, processor cores within an integrated circuit or chip, etc. The compute elements can be coupled to local storage which can include local memory elements, register files, cache storage, etc. The cache, which can include a hierarchical cache, such as a level-1 (L1), a level-2 (L2), and a level-3 (L3) cache working together, can be used for storing data such as intermediate results, compressed control words, coalesced control words, decompressed control words, relevant portions of a control word, and the like. The cache can store data produced by a taken branch path, where the taken branch path is determined by a branch decision. The decompressed control word is used to control one or more compute elements within the array of compute elements. Multiple layers of the two-dimensional (2D) array of compute elements can be "stacked" to comprise a three-dimensional array of compute elements.

The tasks, subtasks, etc., that are associated with processing operations are generated by a complier. The compiler can include a general-purpose compiler, a hardware description-based compiler, a compiler written or "tuned" for the array of compute elements, a constraint-based compiler, a satisfiability-based compiler (SAT solver), and so on. Control is provided to the hardware in the form of control words, where one or more control words are generated by the compiler. The control words are provided to the array on a cycle-by-cycle basis. The control words can include wide, variable length, microcode control words. The length of a microcode control word can be adjusted by compressing the control word. The compressing can be accomplished by recognizing situations where a compute element is unneeded by a task. Thus, control bits within the control word associated with the unneeded compute elements are not required for that compute element. Other compression techniques can also be applied. The control words can be used to route data, to set up operations to be performed by the compute elements, to idle individual compute elements or rows and/or columns of compute elements, etc. The compiled microcode control words associated with the compute elements are distributed to the compute elements. The compute elements are controlled by a control unit which decompresses the control words. The decompressed control words enable processing by the compute elements. The task processing is enabled by executing the one or more control words. In order to accelerate the execution of tasks, to reduce or eliminate stalling for the array of compute elements, and so on, copies of data can be broadcast to a plurality of physical register files comprising 2R1W memory elements. The register files can be distributed across the 2D array of compute elements.

A parallel processing architecture with distributed register files enables task processing. The task processing can include data manipulation. A two-dimensional (2D) array of compute elements is accessed, wherein each compute element within the array of compute elements is known to a compiler and is coupled to its neighboring compute elements within the array of compute elements. The compute elements can include compute elements, processors, or cores within an integrated circuit; processors or cores within an application specific integrated circuit (ASIC); cores programmed within a programmable device such as a field programmable gate array (FPGA); and so on. The compute elements can include homogeneous or heterogeneous processors. Each compute element within the 2D array of compute elements is known to a compiler. The compiler, which can include a general-purpose compiler, a hardware-oriented compiler, or a compiler specific to the compute elements, can compile code for each of the compute elements. Each compute element is coupled to its neighboring compute elements within the array of compute elements. The coupling of the compute elements enables data communication between and among compute elements. Thus, the compiler can control data flow between and among the compute elements, and can also control data commitment to memory outside of the array. The array of compute elements is controlled on a cycle-by-cycle basis, wherein the controlling is enabled by a stream of wide, variable length, control words generated by the compiler. A cycle can include a clock cycle, an architectural cycle, a system cycle, etc. The stream of wide, variable length, control words generated by the compiler provides direct, fine-grained control of the 2D array of compute elements. The fine-grained control can include control of individual compute elements, memory elements, control elements, etc. Virtual registers are mapped to a plurality of physical register files distributed among one or more of the compute elements. The at least two physical register files can be implemented in separate compute elements within the array of compute elements to enable parallel operation processing. The mapping is performed by the compiler. Operations contained in the control words are executed by the compute elements. The operations are enabled by at least one of the plurality of distributed physical register files.

FIG. 1 is a flow diagram for a parallel processing architecture with distributed register files. Groupings of compute elements (CEs), such as CEs assembled within a 2D array of CEs, can be configured to execute a variety of operations associated with data processing. The operations can be based on tasks and on subtasks that are associated with the tasks. The 2D array can further interface with other elements such as controllers, storage elements, ALUs, memory management units (MMUs), GPUs, multiplier elements, and so on. The operations can accomplish a variety of processing objectives such as application processing, data manipulation, data analysis, and so on. The operations can manipulate a variety of data types including integer, real, and character data types; vectors and matrices; tensors; etc. Control is provided to the array of compute elements on a cycle-by-cycle basis, where the control is based on control words generated by a compiler. The control words, which can include microcode control words, enable or idle various compute elements; provide data; route results between or among CEs, caches, and storage; and the like. The control enables compute element operation, memory access precedence, etc. Compute element operation and memory access precedence enable the hardware to properly sequence data provision and compute element results. The control enables execution of a compiled program on the array of compute elements.

The flow 100 includes accessing a two-dimensional (2D) array 110 of compute elements, wherein each compute element within the array of compute elements is known to a compiler and is coupled to its neighboring compute elements within the array of compute elements. The compute elements can be based on a variety of types of processors. The compute elements or CEs can include central processing units (CPUs), graphics processing units (GPUs), processors or processing cores within application specific integrated circuits (ASICs), processing cores programmed within field programmable gate arrays (FPGAs), and so on. In embodiments, compute elements within the array of compute elements have identical functionality. The compute elements can include heterogeneous compute resources, where the heterogeneous compute resources may or may not be collocated within a single integrated circuit or chip. The compute elements can be configured in a topology, where the topology can be built into the array, programmed or configured within the array, etc. In embodiments, the array of compute elements is configured by a control word that can implement a topology. The topology that can be implemented can include one or more of a systolic, a vector, a cyclic, a spatial, a streaming, or a Very Long Instruction Word (VLIW) topology.

The compute elements can further include a topology suited to machine learning computation. A topology for machine learning can include supervised learning, unsupervised learning, reinforcement learning, and other machine learning topologies. The compute elements can be coupled to other elements within the array of CEs. In embodiments, the coupling of the compute elements can enable one or more further topologies. The other elements to which the CEs can be coupled can include storage elements such as one or more levels of cache storage; control units; multiplier units; address generator units for generating load (LD) and store (ST) addresses; queues; register files; and so on. The compiler to which each compute element is known can include a C, C++, or Python compiler. The compiler to which each compute element is known can include a compiler written especially for the array of compute elements. The coupling of each CE to its neighboring CEs enables clustering of compute resources; sharing of elements such as cache elements, multiplier elements, ALU elements, or control elements; communication between or among neighboring CEs; and the like.

The flow 100 includes controlling 120 the array of compute elements on a cycle-by-cycle basis. The controlling the array can include configuration of elements such as compute elements within the array; loading and storing data; routing data to, from, and among compute elements; and so on. A cycle can include a clock cycle, an architectural cycle, a system cycle, a self-timed cycle, and the like. In the flow 100, the control is enabled 122 by a stream of wide, variable length, control words. The control words can include microcode control words, compressed control words, encoded control words, and the like. The control words can be decompressed, used, etc., to configure the compute elements and other elements within the array; to enable or disable individual compute elements, rows and/or columns of compute elements; to load and store data; to route data to, from, and among compute elements; and so on.

The one or more control words are generated 124 by the compiler. The compiler which generates the control words can include a general-purpose compiler such as a C, C++, or Python compiler; a hardware description language compiler such as a VHDL or Verilog compiler; a compiler written for the array of compute elements; and the like. In embodiments, the stream of wide, variable length, control words generated by the compiler provide direct fine-grained control of the 2D array of compute elements. The compiler can be used to map functionality to the array of compute elements. In embodiments, the compiler can map machine learning functionality to the array of compute elements. The machine learning can be based on a machine learning (ML) network, a deep learning (DL) network, a support vector machine (SVM), etc. In embodiments, the machine learning functionality can include a neural network (NN) implementation. The neural network implementation can include a plurality of layers where the layers can include one or more of input layers, hidden layers, output layers, and the like. A control word generated by the compiler can be used to configure one or more CEs, to enable data to flow to or from the CE, to configure the CE to perform an operation, and so on. Depending on the type and size of a task that is compiled to control the array of compute elements, one or more of the CEs can be controlled, while other CEs are unneeded by the particular task. A CE that is unneeded can be marked in the control word as unneeded. An unneeded CE requires no data and no control word. In embodiments, the unneeded compute element can be controlled by a single bit. In other embodiments, a single bit can control an entire row of CEs by instructing hardware to generate idle signals for each CE in the row. The single bit can be set for "unneeded", reset for "needed", or set for a similar usage of the bit to indicate when a particular CE is unneeded by a task.

The control words that are generated by the compiler can include a conditionality such as a branch. The branch can include a conditional branch, an unconditional branch, etc. The control words can be a decompressed by a decompressor logic block that decompresses words from a compressed control word cache on their way to the array. In embodiments, the set of directions can include a spatial allocation of subtasks on one or more compute elements within the array of compute elements. In other embodiments, the set of directions can enable multiple, simultaneous programming loop instances circulating within the array of compute elements. The multiple programming loop instances can include multiple instances of the same programming loop, multiple programming loops, etc.

The flow 100 includes mapping 130 virtual registers to a plurality of physical register files. A virtual register can include a register known within the scope of a task, a subtask, a process, a function, a subroutine, and so on. In embodiments, the virtual registers can be represented by the compiler. The compiler can assign names, labels, etc. to the virtual registers; can use user-defined names; and the like. The number of virtual registers can be substantially similar to or substantially different from a number of physical registers. In embodiments, the number of physical registers can be greater than the number of virtual registers. The mapping of virtual registers to physical registers can be performed based on the location of physical registers, the availability of the physical registers, etc. In a usage example, the mapping a virtual register to a physical register can be based on physical proximity of the physical register to compute elements that access the physical register. The virtual registers can be mapped to greater than one physical register file. In embodiments, at least one of the virtual registers is mapped to at least two physical registers. The physical registers can be collocated, spatially separated, etc. In embodiments, the number of virtual registers can be greater than the number of physical registers. The number of virtual registers can be dependent on the number of tasks, subtasks, processes, procedures, etc.

The physical register files are distributed 132 among one or more of the compute elements. In embodiments, each of the physical register files includes a memory element with two read ports and one write port (2R1W). Discussed throughout, a 2R1W memory element can enable two read operations and one write operation to be executed substantially simultaneously. A 2R1W memory element can include a "standalone" element within the 2-D array of elements, a compute element configured to act as a 2R1W memory element, and the like. In embodiments, a plurality of 2R1W physical register files can be distributed throughout the array of compute elements. The compute elements can be spatially separated, clustered, and the like. A register file can include a 256 read-port, 128 write-port (256R128W) register file, where each read from the 256 read-port, 128 write-port register file can be accomplished by reading locally from a plurality of two read-port, one write-port register files. In embodiments, 2R1W physical register files effectively provide 256-bit reads and 128-bit writes per cycle. An advantage of distributing the virtual registers across a plurality of physical register files is that the register files can contain copies of a dataset, and the register files can be located in proximity to the compute elements that require the data. The proximate location of the data enables fast and low-power data access, and obviates the need to transfer data from a remote physical register file at the time a compute element requires the data. In other embodiments, each of the two or more physical register files can be distributed in a compute element of the array of compute elements.

In the flow 100, the mapping is performed by the compiler 134. At compile time, the compiler can assign virtual registers to one or more physical register files. In embodiments, the mapping of the virtual registers can include renaming by the compiler. The mapping can include memory mapping, address translation, and so on. In embodiments, the renaming by the compilers can be based on a table of register files. The table can include a translation table. The table can be implemented with a read only memory (ROM), an associative memory, etc. The table can include a translation table, a lookup table, a hash table, etc. Using the associative memory for implementing the table enables determination of whether data sought by a compute element, for example, is located within the register file. In other embodiments, the renaming can be determined at compile time. The renaming can be used to label independent tasks, to identify parallelism, etc. In other embodiments, the renaming can enable the compiler to orchestrate execution of operations using the physical register files. The renaming by the compiler can accomplish other execution techniques. In embodiments, the renaming by the compiler can enable distributed execution of operations. In the flow 100, the at least two physical registers can be implemented in separate compute elements 136 within the array of compute elements. The separate compute elements can perform operations such as atomic operations on the data within physical register files. The mapping by the compiler can enable a functionality of the array. The functionality can include audio or image processing, data analysis, and the like. In embodiments, the compiler can map machine learning functionality to the array of compute elements. The machine learning can be based on deep learning. In embodiments, the machine learning functionality can include a neural network implementation. The neural network implementation can include a convolutional neural network, a recurrent neural network, etc.

The flow 100 further includes enabling a broadcast write operation 140 to two or more of the physical register files. The broadcast write operation can include writing data to each of the two or more physical register files comprising two read-port, one write-port memory elements. The broadcasting can be used to load multiple copies of the data into a plurality of physical register files that are collocated with, adjacent to, in proximity to, etc. the compute elements that require access to the data. The flow 100 includes executing operations 150 contained in the control words, wherein the operations are enabled by at least one of the plurality of distributed physical register files. The operations can include arithmetic operations, logical operations, matrix operations, tensor operations, and so on. The operations that are executed are contained in the control words. Discussed above, the control words can include a stream of wide, variable length, control words generated by the compiler. The control words can be used to control the array of compute elements on a cycle-by-cycle basis. A cycle can include a local clock cycle, a self-timed cycle, a system cycle, and the like. The execution can include distributed execution of operations. In embodiments, the distributed execution of operations can occur in two or more compute elements within the array of compute elements. The compute elements can include independent compute elements, clustered compute elements, etc. The implementation in separate compute elements can enable parallel operation processing 152. The parallel operation processing can include processing nodes of a graph that are independent of each other, processing independent tasks and subtasks, etc.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
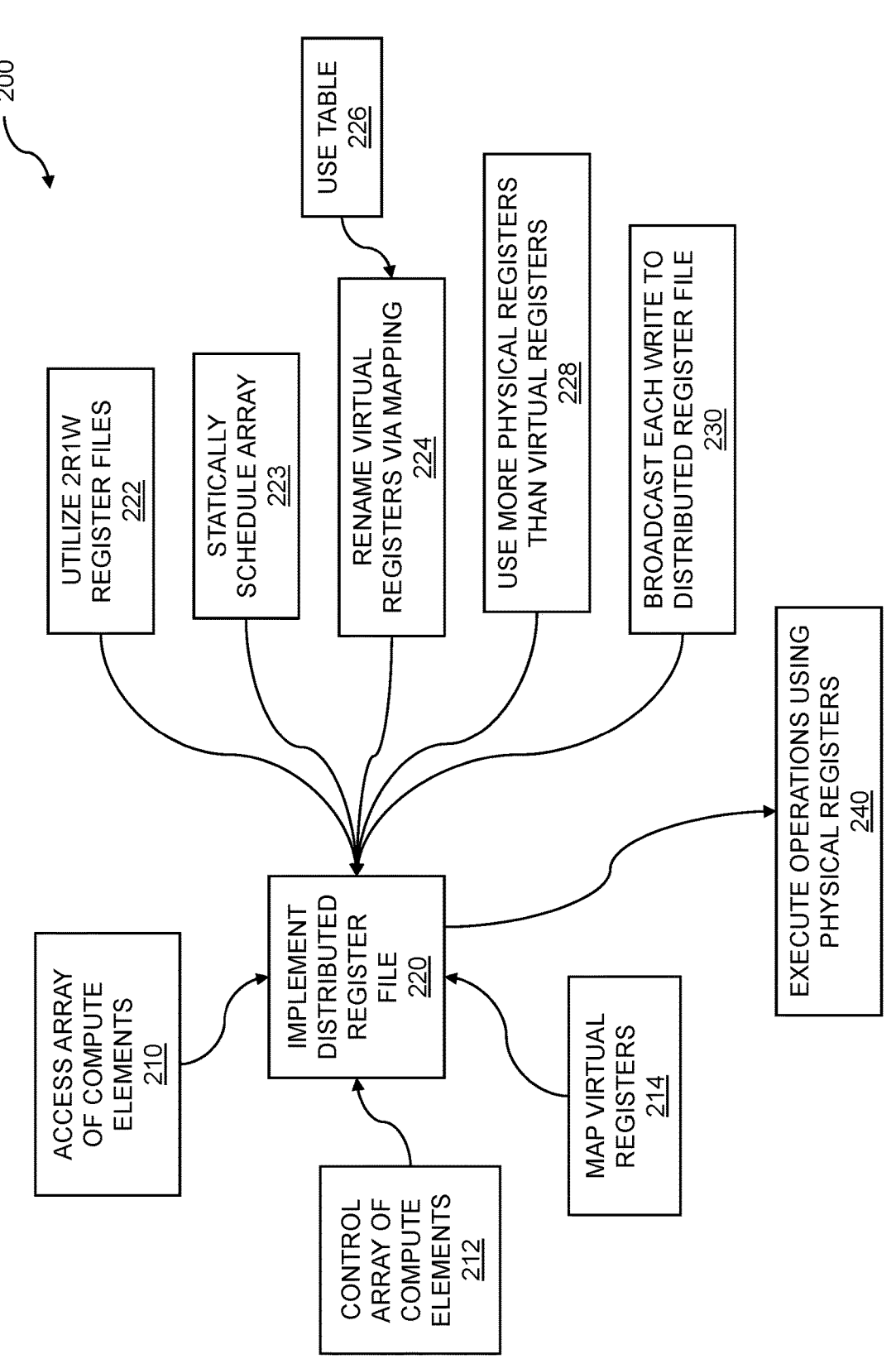
FIG. 2 is a flow diagram for distributed renaming within a statically scheduled array.

FIG. 2 is a flow diagram for distributed renaming within a statically scheduled array. Collections or clusters of compute elements (CEs), such as CEs assembled within a 2D array of CEs, can be configured to execute a variety of operations associated with programs. The operations can be based on tasks, and subtasks that are associated with the tasks. The 2D array can further interface with other elements such as controllers, storage elements, ALUs, MMUs, GPUs, multiplier elements, and the like. The operations can accomplish a variety of processing objectives such as application processing, data manipulation, design and simulation, and so on. The operations can perform manipulations of a variety of data types including integer, real, and character data types; vectors and matrices; tensors; etc. Control is provided to the array of compute elements on a cycle-by-cycle basis, where the control is based on control words generated by a compiler. The control words, which can include microcode control words, enable or idle various compute elements; provide data; route results between or among CEs, caches, and storage; and the like. The control enables compute element operation, memory access precedence, etc. Compute element operation and memory access precedence enable the hardware to properly sequence compute element results.

The control enables execution of a compiled program on the array of compute elements. The compute elements can access registers that contain control words, data, and so on. To simplify application coding, task processing, and so on, virtual registers can be used. The virtual registers can be represented by the compiler, and the virtual registers can be mapped to at least two physical registers. The virtual registers enable a parallel processing architecture with distributed register files. A two-dimensional (2D) array of compute elements is accessed, wherein each compute element within the array of compute elements is known to a compiler and is coupled to its neighboring compute elements within the array of compute elements. The array of compute elements is controlled on a cycle-by-cycle basis, wherein the controlling is enabled by a stream of wide, variable length, control words generated by the compiler. Virtual registers are mapped to a plurality of physical register files distributed among one or more of the compute elements, wherein the mapping is performed by the compiler. Operations contained in the control words are executed, wherein the operations are enabled by at least one of the plurality of distributed physical register files.

The flow 200 includes accessing a two-dimensional (2D) array 210 of compute elements, wherein each compute element within the array of compute elements is known to a compiler and is coupled to its neighboring compute elements within the array of compute elements. The compute elements can be based on a variety of types of processors. The compute elements or CEs can include central processing units (CPUs), graphics processing units (GPUs), processors or processing cores within application specific integrated circuits (ASICs), processing cores programmed within field programmable gate arrays (FPGAs), and so on. In embodiments, compute elements within the array of compute elements have identical functionality. The compute elements can include heterogeneous compute resources, where the heterogeneous compute resources may or may not be collocated within a single integrated circuit or chip. The compute elements can be configured in a topology, where the topology can be built into the array, programmed or configured within the array, etc. In embodiments, the array of compute elements is configured by a control word to implement one or more of a systolic, a vector, a cyclic, a spatial, a streaming, or a Very Long Instruction Word (VLIW) topology.

The compute elements can further include one or more topologies, where a topology can be mapped by the compiler. The topology mapped by the compiler can include a graph such as a directed graph (DG) or directed acyclic graph (DAG), a Petri Net (PN), etc. In embodiments, the compiler maps machine learning functionality to the array of compute elements. The machine learning can be based on supervised, unsupervised, and semi-supervised learning; deep learning (DL); and the like. In embodiments, the machine learning functionality can include a neural network implementation. The compute elements can be coupled to other elements within the array of CEs. In embodiments, the coupling of the compute elements can enable one or more topologies. The other elements to which the CEs can be coupled can include storage elements such as one or more levels of cache storage, multiplier units, address generator units for generating load (LD) and store (ST) addresses, queues, and so on. The compiler to which each compute element is known can include a C, C++, or Python compiler. The compiler to which each compute element is known can include a compiler written especially for the array of compute elements. The coupling of each CE to its neighboring CEs enables sharing of elements such as cache elements, multiplier elements, ALU elements, or control elements; communication between or among neighboring CEs; and the like.

The flow 200 includes controlling the array of compute elements 212 on a cycle-by-cycle basis. The control for the array can include configuring elements such as compute elements and storage elements within the array; loading and storing data; routing data to, from, and among compute elements; and so on. The control is enabled by a stream of wide, variable length, control words generated by the compiler. The control words can configure the compute elements and other elements within the array; enable or disable individual compute elements or rows and/or columns of compute elements; load and store data; route data to, from, and among compute elements; etc. The one or more control words are generated by the compiler as discussed above. The compiler can be used to map functionality to the array of compute elements. A control word generated by the compiler can be used to configure one or more CEs, to enable data to flow to or from the CE, to configure the CE to perform an operation, and so on. Depending on the type and size of a task that is compiled to control the array of compute elements, one or more of the CEs can be controlled, while other CEs are unneeded by the particular task. A CE that is unneeded can be marked in the control word as unneeded. An unneeded CE requires no data, nor is a control word required by it. In embodiments, the unneeded compute element can be controlled by a single bit. In other embodiments, a single bit can control an entire row of CEs by instructing hardware to generate idle signals for each CE in the row. The single bit can be set for "unneeded", reset for "needed", or set for a similar usage of the bit to indicate when a particular CE is unneeded by a task.

The flow 200 includes mapping virtual registers 214 to a plurality of physical register files distributed among one or more of the compute elements. The virtual registers can be registers accessed by a task, a subtask, and the like, using a name, a reference, and so on. The virtual registers can be known only within the scope of a task. The virtual registers can be represented by the compiler. The compiler can map a virtual register to one or more physical registers. In embodiments, at least one of the virtual registers can be mapped to at least two physical registers. The physical registers can include physical registers associated with one or more compute elements within the array of compute elements. In embodiments, the at least two physical registers are implemented in separate compute elements within the array of compute elements. The compute elements can include adjacent compute elements, remote compute elements, etc. The compute elements can perform data manipulations on substantially similar data or different data. In embodiments, the implementation of the physical registers in separate compute elements can enable parallel operation processing.

The flow 200 includes implementing a distributed register file 220 comprising the two-dimensional array of compute elements. A distributed register file, or virtual register file, can include register files that can be distributed across the 2D array of compute elements. The distributed register can include two read-port, one write-port (2R1W) register files. A register file can include a 256 read-port, 128 write-port (256R128W) register file, where each read from the 256 read-port, 128 write-port register file can be accomplished by reading locally from a plurality of two read-port, one write-port register files. An advantage of distributing the virtual register file across a plurality of register files is that the register files can contain copies of a dataset, and the register files can be located in proximity to the compute elements that require the data. The proximate location of the data enables fast data access, and obviates the need to transfer data from a remote physical register file at the time a compute element requires the data. In the flow 200, the implementing can be accomplished by utilizing a plurality of two read-port, one write-port (2R1W) register files 222, wherein each of the two read-port, one write-port register files is located within one compute element of the array of compute elements. The 2R1W register files can contain copies of data which can be used for computations performed by the compute element. In embodiments, the implementing can be accomplished by statically scheduling 223 the array of compute elements to function as a 256 read-port, 128 write-port register file. Numerous other virtual register file implementations are possible with large numbers of read ports and large numbers of write ports. Configuring or scheduling one or more compute elements within the 2D array of compute elements can be based on compiling code. The code can be used to perform tasks, subtasks, routines, processes, and so on. The scheduling can be accomplished by loading the compiled code into one or more elements of the 2D array. The scheduling can include allocating processors and storage, configuring data and signal communications, etc.

In the flow 200, the implementing can be accomplished by renaming 224 access to the two read-port, one write-port register files. In embodiments, the renaming can be accomplished via mapping. In embodiments, the mapping can include memory mapping, address translation, and so on. The flow 200 includes renaming via mapping using a table 226 implemented with an associative memory. The table can include a translation table, a lookup table, a hash table, etc. Using the associative memory for implementing the table enables determination of whether data sought by a compute element, for example, is located within the register file. In embodiments, the renaming can be determined at compile time. In the flow 200, the implementing can be accomplished by using more physical two read-port, one write-port register files 228 than registers within an instruction set for the array of compute elements. The registers can be associated with registers scheduled based on compiled code. Using more physical 2R1W register files enables more copies of data to be distributed across the 2D array of compute elements. In the flow 200, the implementing can be accomplished by broadcasting 230 each write to the distributed register file so that a write is broadcast to a plurality of two read-port, one write-port register files. The broadcasting can be used to write a copy of the data to each 2R1W register files. The flow 200 includes executing operations 240 using physical registers. The operations can include arithmetic operations, logical operations, matrix operations, tensor operations, and so on. The operations that are executed are contained in the control words. Discussed above, the control words can include a stream of wide, variable length, control words generated by the compiler. The control words can be used to control the array of compute elements on a cycle-by-cycle basis. A cycle can include a local clock cycle, a self-timed cycle, a system cycle, and the like. The operations are enabled by at least one of the plurality of distributed physical register files. The plurality of distributed physical register files can enable parallel processing operation of the compute elements.

Figure 3:
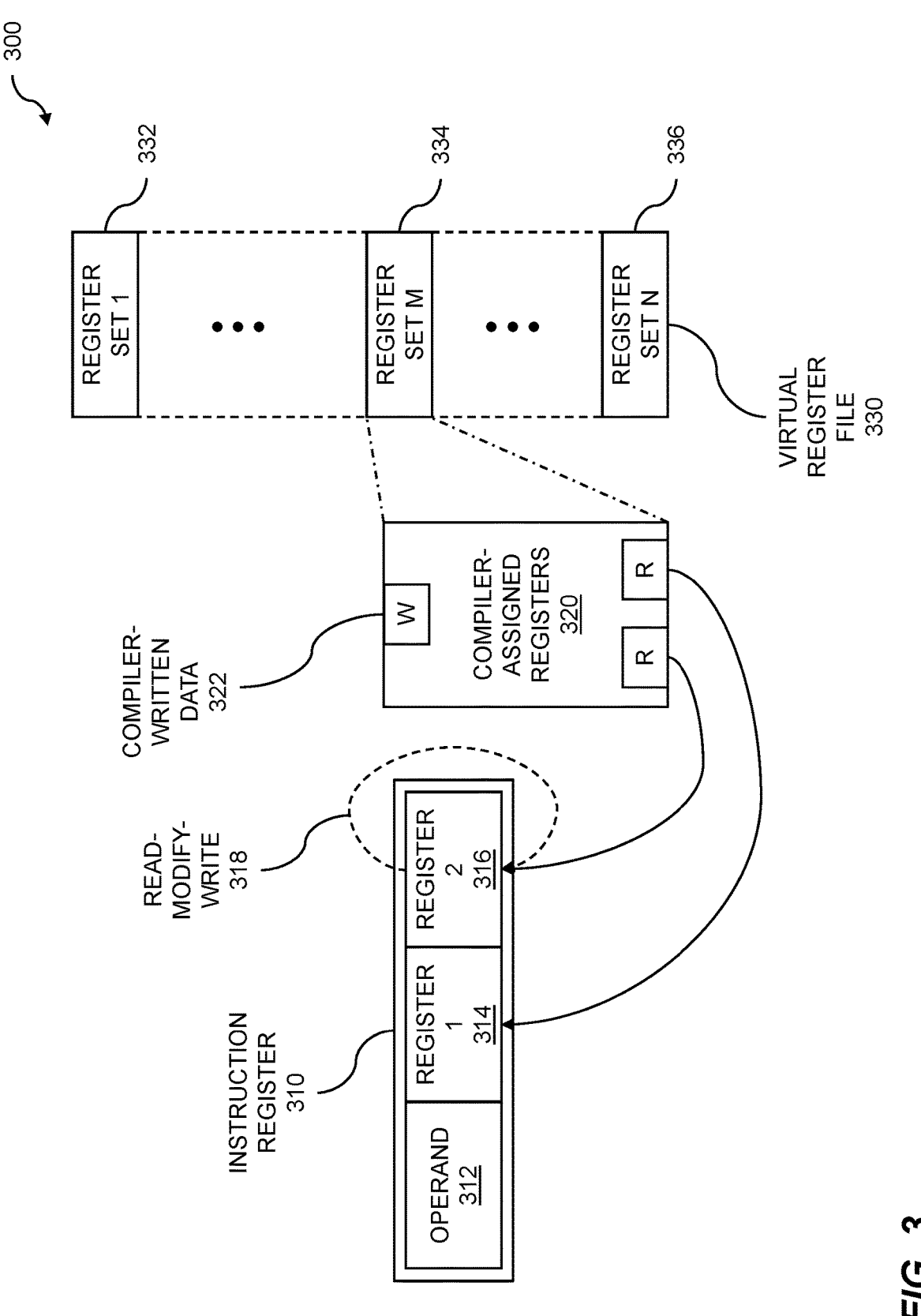
FIG. 3 is a system block diagram for virtual register file implementation.

FIG. 3 is a system block diagram for virtual register file implementation. A virtual register file can comprise a plurality of registers within compute elements of an array of compute elements. In some embodiments, the registers can comprise two read-port, one write-port (2R1W) registers. The virtual register file can be "distributed" across a two-dimensional array of compute elements by storing copies of data in a plurality of compute element local, scratchpad memory. A compute element's instructions and/or data can access the same from the local memory. Accessing the local register(s) greatly accelerates data access and lowers access power. The virtual register file enables a parallel processing architecture with distributed register files. A two-dimensional (2D) array of compute elements is accessed, wherein each compute element within the array of compute elements is known to a compiler and is coupled to its neighboring compute elements within the array of compute elements. The array of compute elements is controlled on a cycle-by-cycle basis, wherein the controlling is enabled by a stream of wide, variable length, control words generated by the compiler. Virtual registers are mapped to a plurality of physical register files distributed among one or more of the compute elements, wherein the mapping is performed by the compiler. Operations contained in the control words are executed, wherein the operations are enabled by at least one of the plurality of distributed physical register files.

The system block diagram can include an instruction register 310. The instruction register can include an instruction, where the instruction can result from compilation of code to perform a task, a subtask, a process, and so on. The instruction can be obtained from memory, loaded when the 2-D array of compute elements is scheduled, and the like. The instruction within the instruction can include one or more fields. In embodiments, the instruction can comprise an operand 312, a first register such as register 1 314, and a second register such as register 2 316. The operand can include an instruction that performs various computational tasks, such as a read-modify-write operation 318. The computational tasks can include arithmetic operations, logical operations, neural network operations, and so on. The operand can operate on operands, where the operands can be loaded into register 1 and register 2. The contents of register 1 and register 2 can be obtained from one or more local, scratchpad memory elements comprising register files, which can comprise one or more 2R1W register files, where the one or more 2R1W register files can be located within one compute element. The one or more 2R1W register files can include compiler assigned register files 320. The compiler writes 322 the assigned register files, which comprise physical register files associated with compute elements within the 2-D array of compute elements. The one or more compute elements can include compute elements within a virtual register file (discussed below). The virtual register file comprises 2R1W register files configured throughout the 2D array of compute elements.

The system block diagram 300 can include a virtual register file 330, which is a logical abstraction of the local, scratchpad memory functionality, and in effect, provides the data that is associated with the operand to register 1 and register 2. The data for the registers can be read at substantially the same time since the virtual register provides two read ports. The virtual register file can include one or more register sets, such as register set 1 332, register set M 334, register set N 336, and so on. The virtual register sets can be associated with a task or subtask, a process, a job, and the like. In embodiments, the virtual registers can be represented by the compiler. The representation of the virtual registers can be based on compiler-assigned names, user-defined names, and so on. In the case of a read-modify-write operation, the operand can perform an operation on the contents of register 1 and register 2 and write the results of performing the operation back into register 2 for use in a subsequent operation. Since the virtual register file comprises a plurality of register files distributed across the 2D array of compute elements, the writing the virtual register file can be accomplished by broadcasting the compiler data or copies of the data to the register files within the plurality of register files. In order to accomplish the broadcasting of the results to the virtual register file, a renaming technique is used to provide access to the 2R1W register files. The renaming can be accomplished via mapping using a table. In embodiments, an associative memory can be used to implement the table. The mapping can be used to direct data to one or more storage locations or elements within a physical register file. The one or more storage locations identified by the mapping can be associated with one or more 2R1W register files.

Figure 4:
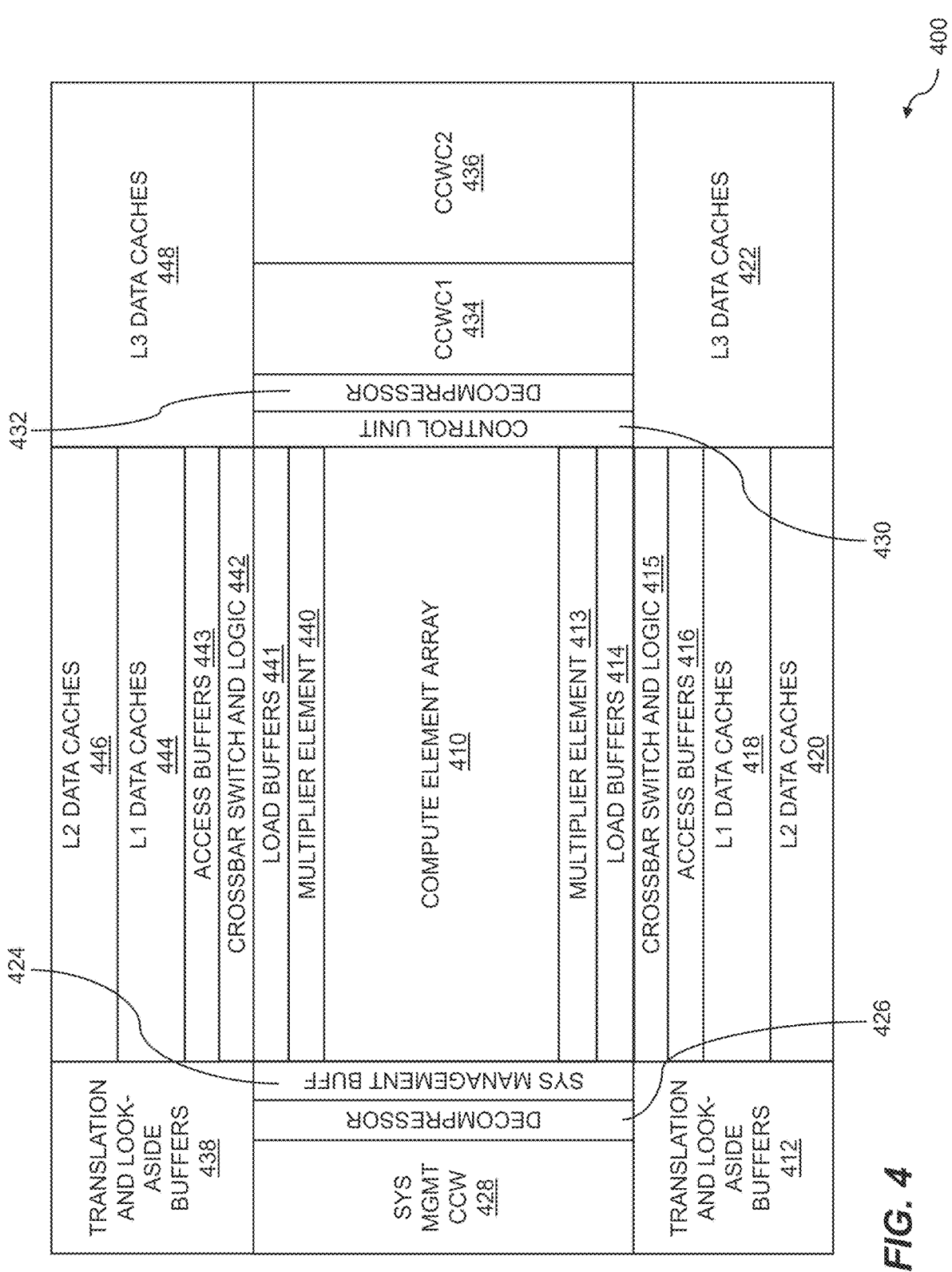
FIG. 4 illustrates a system block diagram for a highly parallel architecture with a shallow pipeline.

FIG. 4 illustrates a system block diagram for a highly parallel architecture with a shallow pipeline. The highly parallel architecture can comprise components including compute elements, processing elements, buffers, one or more levels of cache storage, system management, arithmetic logic units, multipliers, memory management units, and so on. The various components can be used to accomplish parallel processing of tasks, subtasks, and so on. The task processing is associated with program execution, job processing, etc. The task processing is enabled based on parallel processing of multiple loops with loads and stores. A two-dimensional (2D) array of compute elements is accessed, wherein each compute element within the array of compute elements is known to a compiler and is coupled to its
neighboring compute elements within the array of compute
elements. Control for the compute elements is provided on
a cycle-by-cycle basis, wherein control is enabled by a
stream of wide, variable length, control words generated by
the compiler. Memory access operations are tagged with
precedence information, wherein the tagging is contained in
the control words, wherein the tagging is implemented for
loop operations, and wherein the tagging is provided by the
compiler at compile time. Control word data for multiple,
independent loops is loaded into the compute elements. The
multiple, independent loops are executed. Memory is
accessed based on the precedence information, wherein the
memory access includes loads or stores for data relating to
the independent loops.

A system block diagram 400 for a highly parallel archi-
tecture with a shallow pipeline is shown. The system block
diagram can include a compute element array 410. The
compute element array 410 can be based on compute
elements, where the compute elements can include proces-
sors, central processing units (CPUs), graphics processing
units (GPUs), coprocessors, and so on. The compute ele-
ments can be based on processing cores configured within
chips such as application specific integrated circuits
(ASICs), processing cores programmed into programmable
chips such as field programmable gate arrays (FPGAs), and
so on. The compute elements can comprise a homogeneous
array of compute elements. The system block diagram 400
can include translation and look-aside buffers such as trans-
lation and look-aside buffers 412 and 438. The translation
and look-aside buffers can comprise memory caches, where
the memory caches can be used to reduce storage access
times.

The system block diagram 400 can include logic for load
and store access order and selection. The logic for load and
store access order and selection can include crossbar switch
and logic 415 along with crossbar switch and logic 442.
Switch and logic 415 and can accomplish load and store
access order and selection for the lower data cache blocks
(418 and 420), and switch and logic 442 can accomplish
load and store access order and selection for the upper data
cache blocks (444 and 446). Crossbar switch and logic 415
enables high-speed data communication between lower-half
compute elements of compute element array 410 and data
caches 418 and 420 using access buffers 416. Crossbar
switch and logic 442 enables high-speed data communica-
tion between upper-half compute elements of compute ele-
ment array 410 and data caches 444 and 446 using access
buffers 443. The access buffers 416 and 443 allow logic 415
and logic 442, respectively, to hold load or store data until
any memory hazards are resolved. In addition, splitting the
data cache between physically adjacent regions of the com-
pute element array can enable the doubling of load access
bandwidth, the reducing of interconnect complexity, and so
on. While loads can be split, stores can be driven to both
lower data caches 418 and 420 and upper data caches 444
and 446.

The system block diagram 400 can include lower load
buffers 414 and upper load buffers 441. The load buffers can
provide temporary storage for memory load data so that it is
ready for low latency access by the compute element array
410. The system block diagram can include dual level 1 (L1)
data caches, such as L1 data caches 418 and 444. The L1
data caches can be used to hold blocks of load and/or store
data, such as data to be processed together, data to be
processed sequentially, and so on. The L1 cache can include
a small, fast memory that is quickly accessible by the compute elements and other components. The system block
diagram can include level 2 (L2) data caches. The L2 caches
can include L2 caches 420 and 446. The L2 caches can
include larger, slower storage in comparison to the L1
caches. The L2 caches can store "next up" data, results such
as intermediate results, and so on. The L1 and L2 caches can
further be coupled to level 3 (L3) caches. The L3 caches can
include L3 caches 422 and 448. The L3 caches can be larger
than the L2 and L1 caches and can include slower storage.
Accessing data from L3 caches is still faster than accessing
main storage. In embodiments, the L1, L2, and L3 caches
can include 4-way set associative caches.

The system block diagram 400 can include lower multi-
plier element 413 and upper multiplier element 440. The
multiplier elements can provide an efficient multiplication
function of data coming out of the compute element array
and/or data moving into the compute element array. Multi-
plier element 413 can be coupled to the compute element
array 410 and load buffers 414, and multiplier element 440
can be coupled to compute element array 410 and load
buffers 441.

The system block diagram 400 can include a system
management buffer 424. The system management buffer can
be used to store system management codes or control words
that can be used to control the array 410 of compute
elements. The system management buffer can be employed
for holding opcodes, codes, routines, functions, etc. which
can be used for exception or error handling, management of
the parallel architecture for processing tasks, and so on. The
system management buffer can be coupled to a decompres-
sor 426. The decompressor can be used to decompress
system management compressed control words (CCWs)
from system management compressed control word buffer
428 and can store the decompressed system management
control words in the system management buffer 424. The
compressed system management control words can require
less storage than the uncompressed control words. The
system management CCW component 428 can also include
a spill buffer. The spill buffer can comprise a large static
random-access memory (SRAM) which can be used to
support multiple nested levels of exceptions.

The compute elements within the array of compute ele-
ments can be controlled by a control unit such as control unit
430. While the compiler, through the control word, controls
the individual elements, the control unit can pause the array
to ensure that new control words are not driven into the
array. The control unit can receive a decompressed control
word from a decompressor 432 and can drive out the
decompressed control word into the appropriate compute
elements of compute element array 410. The decompressor
can decompress a control word (discussed below) to enable
or idle rows or columns of compute elements, to enable or
idle individual compute elements, to transmit control words
to individual compute elements, etc. The decompressor can
be coupled to a compressed control word store such as
compressed control word cache 1 (CCWC1) 434. CCWC1
can include a cache such as an L1 cache that includes one or
more compressed control words. CCWC1 can be coupled to
a further compressed control word store such as compressed
control word cache 2 (CCWC2) 436. CCWC2 can be used
as an L2 cache for compressed control words. CCWC2 can
be larger and slower than CCWC1. In embodiments,
CCWC1 and CCWC2 can include 4-way set associativity. In
embodiments, the CCWC1 cache can contain decompressed
control words, in which case it could be designated as
DCWC1. In that case, decompressor 432 can be coupled
between CCWC1 434 (now DCWC1) and CCWC2 436.

Figure 5:
FIG. 5 shows compute element array detail.

FIG. 5 shows compute element array detail 500. A compute element array can be coupled to components which enable the compute elements within the array to process one or more tasks, subtasks, and so on. The components can access and provide data, perform specific high-speed operations, and the like. The compute element array and its associated components enable parallel processing of multiple loops with loads and stores. The compute element array 510 can perform a variety of processing tasks, where the processing tasks can include operations such as arithmetic, vector, or matrix operations; audio and video processing operations; neural network operations; etc. The compute elements can be coupled to multiplier units such as lower multiplier units 512 and upper multiplier units 514. The multiplier units can be used to perform high-speed multiplications associated with general processing tasks, multiplications associated with neural networks such as deep learning networks, multiplications associated with vector operations, and the like. The compute elements can be coupled to load queues such as load buffers 516 and load buffers 518. The load buffers, or load queues, can be coupled to the L1 data caches as discussed previously. The load queues can be used to load storage access requests from the compute elements. The load queues can track expected load latencies and can notify a control unit if a load latency exceeds a threshold. Notification of the control unit can be used to signal that a load may not arrive within an expected timeframe. The load queues can further be used to pause the array of compute elements. The load queues can send a pause request to the control unit that will pause the entire array, while individual elements can be idled under control of the control word. When an element is not explicitly controlled, it can be placed in the idle (or low power) state. No operation is performed, but ring buses can continue to operate in a "pass thru" mode to allow the rest of the array to operate properly. When a compute element is used just to route data unchanged through its ALU, it is still considered active.

While the array of compute elements is paused, background loading of the array from the memories (data and control word) can be performed. The memory systems can be free running and can continue to operate while the array is paused. Because multi-cycle latency can occur due to control signal transport, which results in additional "dead time", it can be beneficial to allow the memory system to "reach into" the array and deliver load data to appropriate scratchpad memories while the array is paused. This mechanism can operate such that the array state is known, as far as the compiler is concerned. When array operation resumes after a pause, new load data will have arrived at a scratchpad, as required for the compiler to maintain the statically scheduled model.

Figure 6:
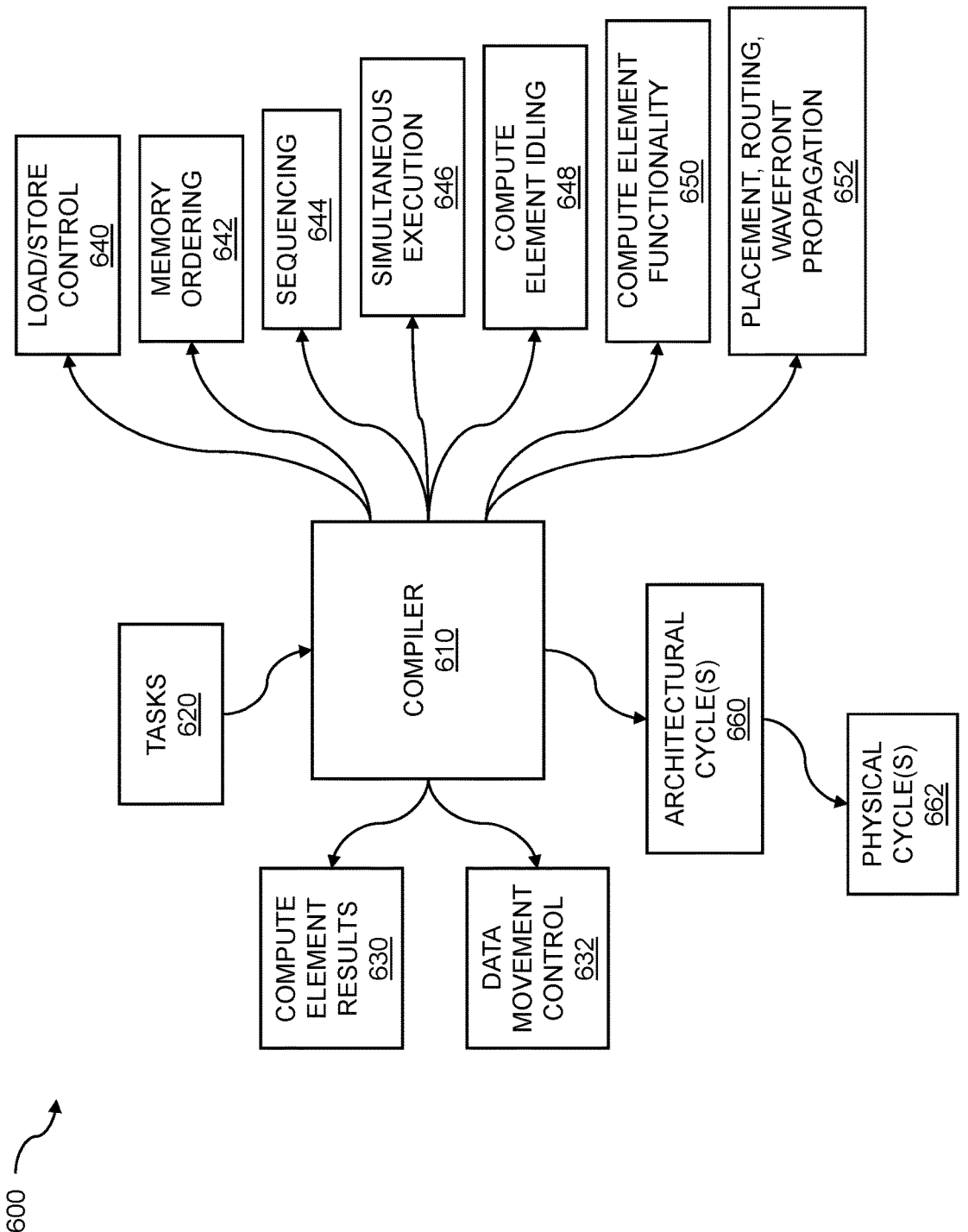
FIG. 6 illustrates a system block diagram for compiler interactions.

FIG. 6 illustrates a system block diagram for compiler interactions. Discussed throughout, compute elements within a 2D array are known to a compiler which can compile tasks and subtasks for execution on the array. The compiled tasks and subtasks are executed to accomplish task processing. A variety of interactions, such as placement of tasks, routing of data, and so on, can be associated with the compiler. The compiler interactions enable a parallel processing architecture with distributed register files. A two-dimensional (2D) array of compute elements is accessed, wherein each compute element within the array of compute elements is known to a compiler and is coupled to its neighboring compute elements within the array of compute elements. The array of compute elements is controlled on a cycle-by-cycle basis, wherein the controlling is enabled by a stream of wide, variable length, control words generated by the compiler. Virtual registers are mapped to a plurality of physical register files distributed among one or more of the compute elements, wherein the mapping is performed by the compiler. Operations contained in the control words are executed, wherein the operations are enabled by at least one of the plurality of distributed physical register files.

The system block diagram 600 includes a compiler 610. The compiler can include a high-level compiler such as a C, C++, Python, or similar compiler. The compiler can include a compiler implemented for a hardware description language such as a VHDL™ or Verilog™ compiler. The compiler can include a compiler for a portable, language-independent, intermediate representation such as low-level virtual machine (LLVM) intermediate representation (IR). The compiler can generate a set of directions that can be provided to the computer elements and other elements within the array. The compiler can be used to compile tasks 620. The tasks can include a plurality of tasks associated with a processing task. The tasks can further include a plurality of subtasks. The tasks can be based on an application such as a video processing or audio processing application. In embodiments, the tasks can be associated with machine learning functionality. The compiler can generate directions for handling compute element results 630. The compute element results can include results derived from arithmetic, vector, array, and matrix operations; Boolean operations; and so on. In embodiments, the compute element results are generated in parallel in the array of compute elements. Parallel results can be generated by compute elements when the compute elements can share input data, use independent data, and the like. The compiler can generate a set of directions that controls data movement 632 for the array of compute elements. The control of data movement can include movement of data to, from, and among compute elements within the array of compute elements. The control of data movement can include loading and storing data, such as temporary data storage, during data movement. In other embodiments, the data movement can include intra-array data movement.

As with a general-purpose compiler used for generating tasks and subtasks for execution on one or more processors, the compiler can provide directions for task and subtasks handling, input data handling, intermediate and result data handling, and so on. The compiler can further generate directions for configuring the compute elements, storage elements, control units, ALUs, and so on, associated with the array. As previously discussed, the compiler generates directions for data handling to support the task handling. In the system block diagram, the data movement can include loads and stores 640 with a memory array. The loads and stores can include handling various data types such as integer, real or float, double-precision, character, and other data types. The loads and stores can load and store data into local storage such as registers, register files, caches, and the like. The caches can include one or more levels of cache such as a level 1 (L1) cache, level 2 (L2) cache, level 3 (L3) cache, and so on. The loads and stores can also be associated with storage such as shared memory, distributed memory, etc. In addition to the loads and stores, the compiler can handle other memory and storage management operations including memory precedence. In the system block diagram, the memory access precedence can enable ordering of memory data 642. Memory data can be ordered based on task data requirements, subtask data requirements, and so on. The memory data ordering can enable parallel execution of tasks and subtasks.

In the system block diagram 600, the ordering of memory data can enable compute element result sequencing 644. In order for task processing to be accomplished successfully, tasks and subtasks must be executed in an order that can accommodate task priority, task precedence, a schedule of operations, and so on. The memory data can be ordered such that the data required by the tasks and subtasks can be available for processing when the tasks and subtasks are scheduled to be executed. The results of the processing of the data by the tasks and subtasks can therefore be ordered to optimize task execution, to reduce or eliminate memory contention conflicts, etc. The system block diagram includes enabling simultaneous execution 646 of two or more potential compiled task outcomes based on the set of directions. The code that is compiled by the compiler can include branch points, where the branch points can include computations or flow control. Flow control transfers program execution to a different sequence of control words. Since the result of a branch decision, for example, is not known a priori, the initial operations associated with both paths are encoded in the currently executing control word stream. When the correct result of the branch is determined, then the sequence of control words associated with the correct branch result continues execution, while the operations for the branch path not taken are halted and side effects may be flushed. In embodiments, the two or more potential branch paths can be executed on spatially separate compute elements within the array of compute elements.

The system block diagram includes compute element idling 648. In embodiments, the set of directions from the compiler can idle an unneeded compute element within a row of compute elements located in the array of compute elements. Not all of the compute elements may be needed for processing, depending on the tasks, subtasks, and so on that are being processed. The compute elements may not be needed simply because there are fewer tasks to execute than there are compute elements available within the array. In embodiments, the idling can be controlled by a single bit in the control word generated by the compiler. In the system block diagram, compute elements within the array can be configured for various compute element functionalities 650. The compute element functionality can enable various types of compute architectures, processing configurations, and the like. In embodiments, the set of directions can enable machine learning functionality. The machine learning functionality can be trained to process various types of data such as image data, audio data, medical data, etc. In embodiments, the machine learning functionality can include neural network implementation. The neural network can include a convolutional neural network, a recurrent neural network, a deep learning network, and the like. The system block diagram can include compute element placement, results routing, and computation wave-front propagation 652 within the array of compute elements. The compiler can generate directions or instructions that can place tasks and subtasks on compute elements within the array. The placement can include placing tasks and subtasks based on data dependencies between or among the tasks or subtasks, placing tasks that avoid memory conflicts or communications conflicts, etc. The directions can also enable computation wave-front propagation. Computation wave-front propagation can implement and control how execution of tasks and subtasks proceeds through the array of compute elements.

In the system block diagram, the compiler can control architectural cycles 660. An architectural cycle can include an abstract cycle that is associated with the elements within the array of elements. The elements of the array can include compute elements, storage elements, control elements, ALUs, and so on. An architectural cycle can include an "abstract" cycle, where an abstract cycle can refer to a variety of architecture level operations such as a load cycle, an execute cycle, a write cycle, and so on. The architectural cycles can refer to macro-operations of the architecture rather than to low level operations. One or more architectural cycles are controlled by the compiler. Execution of an architectural cycle can be dependent on two or more conditions. in embodiments, an architectural cycle can occur when a control word is available to be pipelined into the array of compute elements and when all data dependencies are met. That is, the array of compute elements does not have to wait for either dependent data to load or for a full memory queue to clear. In the system block diagram, the architectural cycle can include one or more physical cycles 662. A physical cycle can refer to one or more cycles at the element level required to implement a load, an execute, a write, and so on. In embodiments, the set of directions can control the array of compute elements on a physical cycle-by-cycle basis. The physical cycles can be based on a clock such as a local, module, or system clock, or some other timing or synchronizing technique. In embodiments, the physical cycle-by-cycle basis can include an architectural cycle. The physical cycles can be based on an enable signal for each element of the array of elements, while the architectural cycle can be based on a global, architectural signal. In embodiments, the compiler can provide, via the control word, valid bits for each column of the array of compute elements, on the cycle-by-cycle basis. A valid bit can indicate that data is valid and ready for processing, that an address such as a jump address is valid, and the like. In embodiments, the valid bits can indicate that a valid memory load access is emerging from the array. The valid memory load access from the array can be used to access data within a memory or storage element. In other embodiments, the compiler can provide, via the control word, operand size information for each column of the array of compute elements. Various operand sizes can be used. In embodiments, the operand size can include bytes, half-words, words, and double-words.

Figure 7:
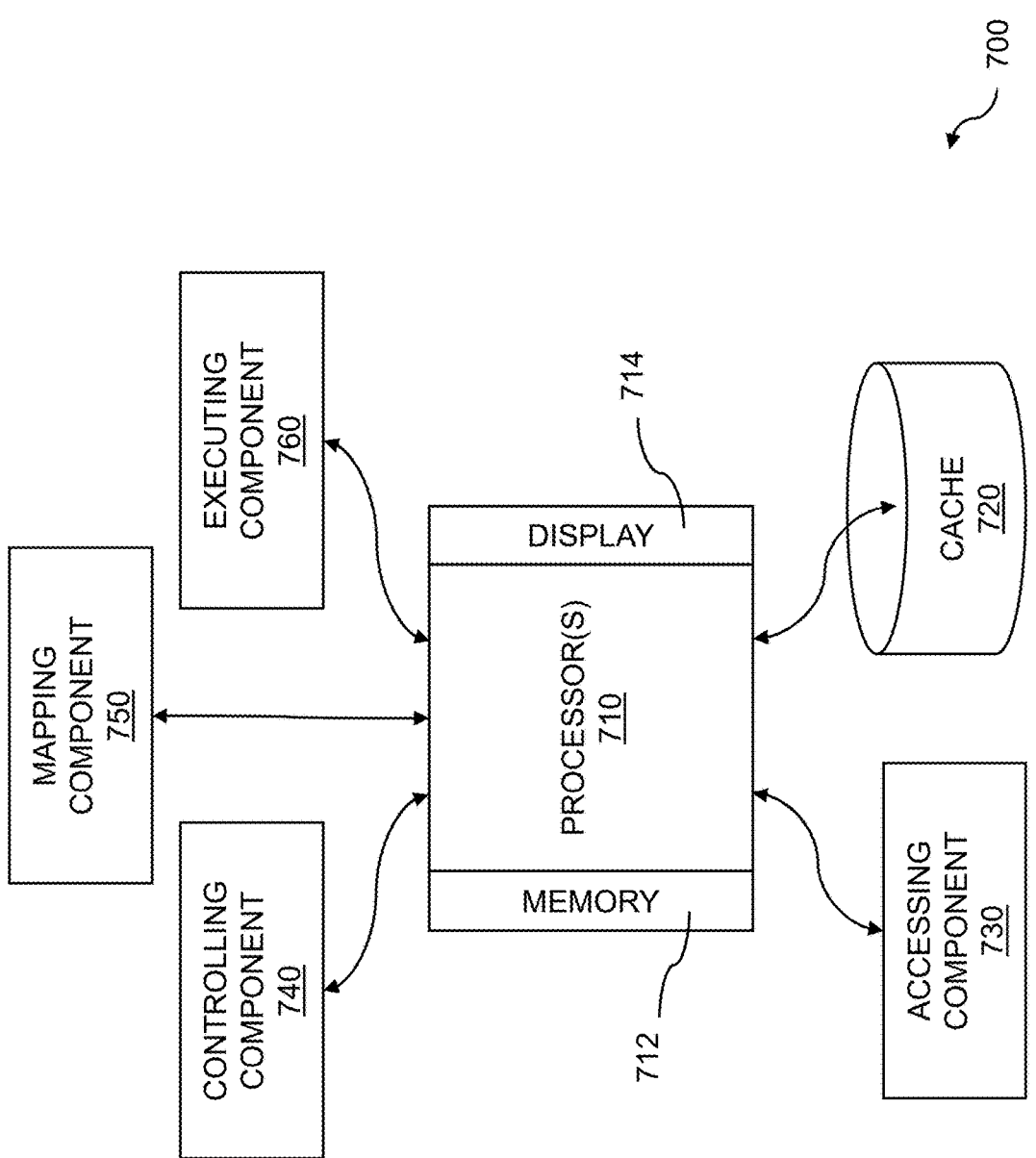
FIG. 7 is a system diagram for distributed renaming within a statically scheduled array.

FIG. 7 is a system diagram for task processing. The task processing is enabled by a parallel processing architecture with distributed register files. The system 700 can include one or more processors 710, which are attached to a memory 712 which stores instructions. The system 700 can further include a display 714 coupled to the one or more processors 710 for displaying data; access rewrites, intermediate steps; directions; control words; compressed control words; control words implementing Very Long Instruction Word (VLIW) functionality; topologies including systolic, vector, cyclic, spatial, streaming, or VLIW topologies; and so on. In embodiments, one or more processors 710 are coupled to the memory 712, wherein the one or more processors, when executing the instructions which are stored, are configured to: access a two-dimensional (2D) array of compute elements, wherein each compute element within the array of compute elements is known to a compiler and is coupled to its neighboring compute elements within the array of compute elements; control the array of compute elements on a cycle-by-cycle basis, wherein the controlling is enabled by a stream of wide, variable length, control words generated by the compiler; map virtual registers to a plurality of physical register files distributed among one or more of the compute elements, wherein the mapping is performed by the compiler; and execute operations contained in the control words, wherein the operations are enabled by at least one of the plurality of distributed physical register files. The compute elements can include compute elements within one or more integrated circuits or chips; compute elements or cores configured within one or more programmable chips such as application specific integrated circuits (ASICs); field programmable gate arrays (FPGAs); heterogeneous processors configured as a mesh; standalone processors; etc.

The system 700 can include a cache 720. The cache 720 can be used to store data such as data associated with mapping virtual register files to physical register files based on 2R1W register files, mapping of the virtual registers including renaming by the compiler, directions to compute elements, control words, intermediate results, microcode, branch decisions, and so on. The cache can comprise a small, local, easily accessible memory available to one or more compute elements. In embodiments, the data that is stored can include data associated with mapping a virtual register into at least two physical registers. Embodiments include storing relevant portions of a control word within the cache associated with the array of compute elements. The cache can be accessible to one or more compute elements. The cache, if present, can include a dual read, single write (2R1W) cache. That is, the 2R1W cache can enable two read operations and one write operation contemporaneously without the read and write operations interfering with one another.

The system 700 can include an accessing component 730. The accessing component 730 can include control logic and functions for accessing a two-dimensional (2D) array of compute elements. Each compute element within the array of compute elements is known to a compiler and is coupled to its neighboring compute elements within the array of compute elements. A compute element can include one or more processors, processor cores, processor macros, and so on. Each compute element can include an amount of local storage. The local storage may be accessible to one or more compute elements. Each compute element can communicate with neighbors, where the neighbors can include nearest neighbors or more remote "neighbors". Communication between and among compute elements can be accomplished using a bus such as an industry standard bus, a ring bus, a network such as a wired or wireless computer network, etc. In embodiments, the ring bus is implemented as a distributed multiplexor (MUX).

The system 700 can include a controlling component 740. The controlling component 740 can include control and functions for controlling the array of compute elements on a cycle-by-cycle basis, wherein the controlling is enabled by a stream of wide, variable length control words generated by the compiler. The control words can be based on low-level control words such as assembly language words, microcode words, firmware words, and so on. The control of the array of compute elements on a cycle-by-cycle basis can include configuring the array to perform various compute operations. In embodiments, the stream of wide, variable length control words generated by the compiler provide direct fine-grained control of the 2D array of compute elements. The compute operations can include a read-modify-write operation. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. A control can enable machine learning functionality for the neural network topology.

The system block diagram 700 can include mapping component 750. The mapping component 750 can include control and functions for mapping virtual registers to a plurality of physical register files distributed among one or more of the compute elements, wherein the mapping is performed by the compiler. In embodiments, the virtual registers are represented by the compiler. The representation can include a user or compiler generated name, a label, a tag, a reference, and so on. The array of compute elements can include physical registers, where the physical registers can be associated with one or more compute elements. The number of physical registers can be based on the size of the 2-D array, the number of compute elements, etc. In embodiments, the number of physical registers can be greater than the number of virtual registers. A virtual register can be mapped onto more than one physical register. In embodiments, at least one of the virtual registers can be mapped to at least two physical registers. The physical registers to which the virtual registers are mapped can be associated with a single compute element, or can be associated with two or more compute elements. By mapping the virtual registers to physical registers implemented in separate compute elements, parallel operation processing can be enabled.

The system 700 can include an executing component 760. The executing component 760 can include control and functions for executing operations contained in the control words, wherein the operations are enabled by at least one of the plurality of distributed physical register files. The operations that can be performed can include arithmetic operations, Boolean operations, matrix operations, neural network operations, and the like. The operations can be executed based on the control words generated by the compiler. The control words can be provided to a control unit where the control unit can control the operations of the compute elements within the array of compute elements. Operation of the compute elements can include configuring the compute elements, providing data to the compute elements, routing and ordering results from the compute elements, and so on. In embodiments, the same decompressed control word can be executed on a given cycle across the array of compute elements. The control words can be decompressed to provide control on a per compute element basis, where each control word can be comprised of a plurality of compute element control groups or bunches. One or more control words can be stored in a compressed format within a memory such as a cache. The compression of the control words can greatly reduce storage requirements. In embodiments, the control unit can operate on decompressed control words. The executing operations contained in the control words can include distributed execution of operations. In embodiments, the distributed execution of operations can occur in two or more compute elements within the array of compute elements. Recall that the mapping of the virtual registers can include renaming by the compiler. In embodiments, the renaming can enable the compiler to orchestrate execution of operations using the physical register files.

The system 700 can include a computer program product embodied in a non-transitory computer readable medium for task processing, the computer program product comprising code which causes one or more processors to perform operations of: accessing a two-dimensional (2D) array of compute elements, wherein each compute element within the array of compute elements is known to a compiler and is coupled to its neighboring compute elements within the array of compute elements; controlling the array of compute elements on a cycle-by-cycle basis, wherein the controlling is enabled by a stream of wide, variable length, control words generated by the compiler; mapping virtual registers to a plurality of physical register files distributed among one or more of the compute elements, wherein the mapping is performed by the compiler; and executing operations contained in the control words, wherein the operations are enabled by at least one of the plurality of distributed physical register files.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for task processing comprising:

accessing a two-dimensional (2D) array of compute elements, wherein each compute element within the array of compute elements is known to a compiler and is coupled to its neighboring compute elements within the array of compute elements;

controlling the array of compute elements on a cycle-by-cycle basis, wherein the controlling is enabled by a stream of wide, variable length, control words generated by the compiler;

mapping virtual registers to a plurality of physical register files distributed among one or more of the compute elements, wherein the mapping is performed by the compiler, and wherein the mapping of the virtual registers includes renaming by the compiler; and executing operations contained in the control words, wherein the renaming by the compiler enables distributed execution of operations, and wherein the operations are enabled by at least one of the plurality of distributed physical register files, and wherein the distributed execution of operations occurs in two or more compute elements within the array of compute elements.

2. The method of claim 1 wherein the virtual registers are represented by the compiler.

3. The method of claim 2 wherein the number of physical registers is greater than the number of virtual registers.

4. The method of claim 3 wherein at least one of the virtual registers is mapped to at least two physical registers.

5. The method of claim 4 wherein the at least two physical registers are implemented in separate compute elements within the array of compute elements.

6. The method of claim 5 wherein the implementation in separate compute elements enables parallel operation processing.

7. The method of claim 2 wherein the number of virtual registers is greater than the number of physical registers.

8. The method of claim 1 wherein the renaming by the compilers is based on a table of register files.

9. The method of claim 1 wherein the renaming enables the compiler to orchestrate execution of operations using the physical register files.

10. The method of claim 1 wherein each of the physical register files comprises a memory element with two read ports and one write port (2R1W).

11. The method of claim 10 wherein a plurality of 2R1W physical register files is distributed throughout the array.

12. The method of claim 10 wherein the 2R1W physical register files effectively provide 256-bit reads and 128-bit writes per cycle.

13. The method of claim 1 further comprising enabling a broadcast write operation to two or more of the physical register files.

14. The method of claim 13 wherein each of the two or more physical register files is distributed in a compute element of the array of compute elements.

15. The method of claim 1 wherein the compiler maps machine learning functionality to the array of compute elements.

16. The method of claim 15 wherein the machine learning functionality includes a neural network implementation.

17. The method of claim 1 wherein the stream of wide, variable length, control words generated by the compiler provides direct control of the 2D array of compute elements.

18. A computer program product embodied in a non-transitory computer readable medium for task processing, the computer program product comprising code which causes one or more processors to perform operations of:

accessing a two-dimensional (2D) array of compute elements, wherein each compute element within the array of compute elements is known to a compiler and is coupled to its neighboring compute elements within the array of compute elements;

controlling the array of compute elements on a cycle-by-cycle basis, wherein the controlling is enabled by a stream of wide, variable length, control words generated by the compiler;

mapping virtual registers to a plurality of physical register files distributed among one or more of the compute elements, wherein the mapping is performed by the compiler, and wherein the mapping of the virtual registers includes renaming by the compiler; and executing operations contained in the control words, wherein the renaming by the compiler enables distributed execution of operations, and wherein the operations are enabled by at least one of the plurality of distributed physical register files, and wherein the distributed execution of operations occurs in two or more compute elements within the array of compute elements.

19. A computer system for task processing comprising:

a memory which stores instructions;

one or more processors coupled to the memory, wherein the one or more processors, when executing the instructions which are stored, are configured to:

access a two-dimensional (2D) array of compute elements, wherein each compute element within the array of compute elements is known to a compiler and is coupled to its neighboring compute elements within the array of compute elements;

control the array of compute elements on a cycle-by-cycle basis, wherein the controlling is enabled by a stream of wide, variable length, control words generated by the compiler;

map virtual registers to a plurality of physical register files distributed among one or more of the compute elements, wherein the mapping is performed by the compiler, and wherein mapping of the virtual registers includes renaming by the compiler; and execute operations contained in the control words, wherein the renaming by the compiler enables distributed execution of operations, and wherein the operations are enabled by at least one of the plurality of distributed physical register files, and wherein the distributed execution of operations occurs in two or more compute elements within the array of compute elements.

* * * * *